United States Patent [19]

Moon

[11] Patent Number: 5,896,405
[45] Date of Patent: Apr. 20, 1999

[54] APPARATUS FOR RESTORING A DIGITAL TRANSMISSION SIGNAL

[75] Inventor: Heon-hee Moon, Suwon, Rep. of Korea

[73] Assignee: Samsung Electronics Co., Ltd., Kyungki-do, Rep. of Korea

[21] Appl. No.: 08/588,698

[22] Filed: Jan. 19, 1996

[30] Foreign Application Priority Data

Jan. 19, 1995 [KR] Rep. of Korea .................... 95-873

[51] Int. Cl.$^6$ .......................... G06F 11/10; H03M 13/12
[52] U.S. Cl. ........................ 371/43.7; 375/286; 375/341; 375/354
[58] Field of Search ........................... 371/43.7, 44, 45; 375/286, 341, 354, 296, 331, 346

[56] References Cited

U.S. PATENT DOCUMENTS

| | | | |
|---|---|---|---|
| 5,241,563 | 8/1993 | Paik et al. | 375/1 |
| 5,398,260 | 3/1995 | Min | 375/286 |
| 5,442,646 | 8/1995 | Chadwick et al. | 371/43 |
| 5,535,220 | 7/1996 | Kanno et al. | 371/2.1 |

*Primary Examiner*—Emmanuel L. Moise
*Attorney, Agent, or Firm*—Sughrue, Mion, Zinn, Macpeak & Seas, PLLC

[57] ABSTRACT

An apparatus for receiving data block-interleaved and multi level/phase modulated data and restoring the block-interleaved multi level/phase modulated data into original data, comprises a demodulation and error correction portion for demodulating and error-correcting data to be received and outputting the modulated and error-corrected data; a synchronization portion for generating a fixed sync position signal, based on the comparison between the data output from the demodulation and error correction portion and stored block sync data; and a block deinterleaver for block-deinterleaving the data which is output from the demodulation and error correction portion according to the fixed sync position signal. The apparatus makes certain that a sync signal for block deinterleaving is identical to a sync signal at the transmission end and performs block deinterleaving even though no error correction is made. Furthermore, the present invention is capable of reliably detecting a sync signal, even when the sync signal is momentarily deviated because error correction is not completely made.

10 Claims, 5 Drawing Sheets

1

APPARATUS FOR RESTORING A DIGITAL TRANSMISSION SIGNAL

BACKGROUND OF THE INVENTION

The present invention relates to an apparatus for restoring modulation data and error correcting/coding data for use in a digital transmission system, and more particularly, to a data restoration apparatus which further improves reliability of block deinterleaving with respect to data which is modulated using multi level/phase modulation and is error-corrected.

In a general digital communication system, a transmission signal from a transmission end is received at the receiver in a data form different from the original signal due to noise caused by poor transmission conditions of the channel. A error correction code is used for correcting an error due to such a noise, for which a convolutional encoder is employed. Since a convolutional encoder is resistive to random error and is susceptible to burst error, the encoder is generally used with an interleaver which disperses burst error added on the channel in a random manner. FIG. 1 shows an example of a conventional digital communication system which employs the convolutional encoder and the interleaver, a transmission portion 4 includes a convolutional encoder 1, an interleaver 2 and a modulator 3, and a receiving portion 8 includes a demodulator 7, deinterleaver 6 and a convolutional decoder 5. Convolutional encoder 1 convolution-codes data from the external information source and transmits the convolutional-coded data to interleaver 2, which interleaves the received data and supplies the data randomized by interleaving to modulator 3. Modulator 3 frequency-modulates the received data to transmit the modulated data to the channel. Demodulator 7 in the receiving portion 8 demodulates the modulated data which is transmitted through the channel and outputs the demodulated data to deinterleaver 6. Deinterleaver 6 rearranges and outputs the demodulated data in an order similar to that prior to interleaving. The rearranged data in deinterleaver 6 is decoded in convolutional decoder 5 and is restored to its original data form.

To improve error correction efficiency with respect to burst error, a receiver in an enhanced digital communication system is shown in FIG. 2. This system employs a PSN deinterleaving method using pseudo random numbers and a block deinterleaving method.

FIG. 2 is a data format showing a restoring apparatus for multi level/phase modulation data. This shows a series of processes for the case when data at the transmission end is interleaved, RS coded, Trellis coded, modulated and then transmitted to a receiver. At the receiver, the received data is demodulated and restored to its original data form.

In FIG. 2, a demodulator 10 demodulates the received modulated data. I-axis data (I) which is in-phase data demodulated in a demodulator and Q-axis data (Q) which is quadrature-phase data demodulated in a demodulator are supplied to a deinterleaver 13. Since the respective I-axis and Q-axis data have been interleaved, deinterleaver 13 deinterleaves the respective I-axis and Q-axis data based on a predetermined sync position and outputs the deinterleaved data to a Trellis decoder 14. Trellis decoder 14 discriminates whether or not the Trellis-decoded data is synchronized. A Viterbi algorithm is used for such sync discrimination. Trellis decoder 14 repetitively performs a process of selecting a path, where a Hamming distance is shortest among the paths to which the data is input in a Trellis diagram, to find a path having the minimum Hamming distance entirely. If a cumulative distance of the path is larger than a predetermined reference value, Trellis decoder 14 indicates that the sync does not match and generates a predetermined out-of-sync signal $S_1$. The predetermined reference value is determined by a designer and is experimentally obtained. Out-of-sync signal $S_1$ at the output of Trellis decoder 14 is supplied to a first sync detector 15 and a second sync detector 17.

First sync detector 15 outputs a predetermined control signal $S_2$ which is supplied to deinterleaver 13 whenever out-of-sync signal $S_1$ is generated. The control signal $S_2$ causes adjustment of the sync position for a deinterleaving operation of deinterleaver 13.

Deinterleaver 13 adjusts the sync position whenever the sync adjustment control signal $S_2$ is applied thereto, and performs a deinterleaving operation at the new sync position. The data deinterleaved according to the new sync position is supplied to Trellis decoder 14. Trellis decoder 14 Trellis-decodes the input data based on the new sync position and determines if the sync is matched. Trellis decoder 14 finds a sync from the input data by repetitively performing sync detection processes.

If a sync condition is detected after Trellis decoding, the data decoded in Trellis decoder 14 is supplied to a block deinterleaver 16. Block deinterleaver 16 deinterleaves, in units of a block, the data which has been interleaved in a modulator at the transmission end. A second sync detector 17 detects a sync condition of the block data which is deinterleaved in block deinterleaver 16. Second sync detector 17 is disabled by the out-of-sync signal $S_1$ from Trellis decoder 14. The block data at the output of block deinterleaver 16 is supplied to a Reed Solomon (RS) decoder 18. RS decoder 18 RS-decodes the data which has been RS-coded at the transmission end to reinforce an error correction function for the transmission data. Here, RS decoder 18 decodes the block data while matching a block sync signal which is supplied from second sync detector 17.

Such a conventional restoring apparatus of the multi level/phase modulation data does not restore exactly the original information data when a phase error occurs in the demodulated I- and Q-channel data.

In order to solve this problem, a conventional method and apparatus for restoring multi level/phase modulated data is disclosed in U.S. Pat. No. 5,398,260 which issued on Mar. 14, 1995. This patent mentions technology capable of finding sync data in a demodulator even though a phase error of ±90° is generated.

However, in a case that sync signal data for block deinterleaving which is error-corrected by the system disclosed in the above patent is different from a sync signal at the transmission end, that is, in a case that a sync signal is not completely due to added error there has a drawback that a good operation of block deinterleaving cannot be performed.

SUMMARY OF THE INVENTION

Therefore, to solve the above problems, it is an object of the present invention to provide a separate sync detector for a deinterleaving operation of a block deinterleaver.

The object of the present invention can be accomplished by providing an apparatus for receiving data block-interleaved and multi level/phase modulated data and restoring the block-interleaved multi level/phase modulated data into the form of the original data, the apparatus comprising:

a demodulation and error correction portion for demodulating and error-correcting received data and outputting the modulated and error-corrected data; a synchronization portion for generating a fixed sync position signal, based on the comparison between the data output from the demodulation and error correction portion and stored block sync data; and a block deinterleaver for block-deinterleaving the data which is output from the demodulation and error correction portion according to the fixed sync position signal.

Preferably, the synchronization portion comprises a delay for delaying data from the demodulation and error correction portion, and outputting at the same time a plurality of delayed data at positions corresponding to where sync codes, being components of the block sync data, are inserted; a detector for detecting a sync position signal, based on the comparison result between a plurality of delayed data from the delay and stored sync codes, which are components of the block sync data; a unit for generating a predetermined internal sync position signal; and sync discriminator for generating the fixed sync position signal when the sync position signal detected by the detector accords with the internal sync position signal.

DETAILED DESCRIPTION OF THE PREFERRED EMBODIMENT

A preferred embodiment of the present invention will be described below in more detail with reference to the accompanying drawings of FIG. 3 to FIG. 6.

Figure 1:
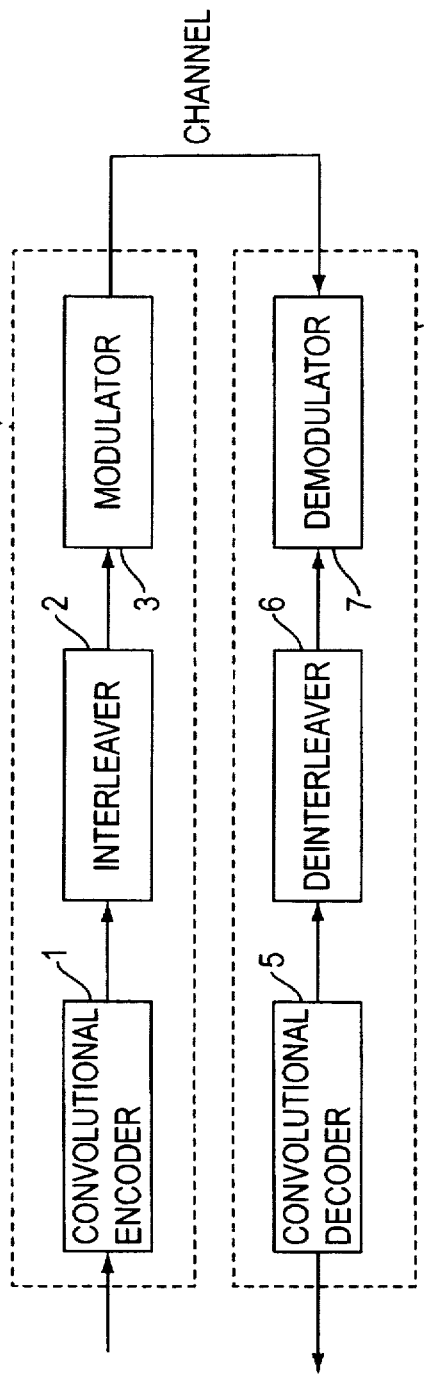
FIG. 1 is a data format showing a conventional digital communication system which employs a convolutional encoder for error correction encoding.
Figure 2:
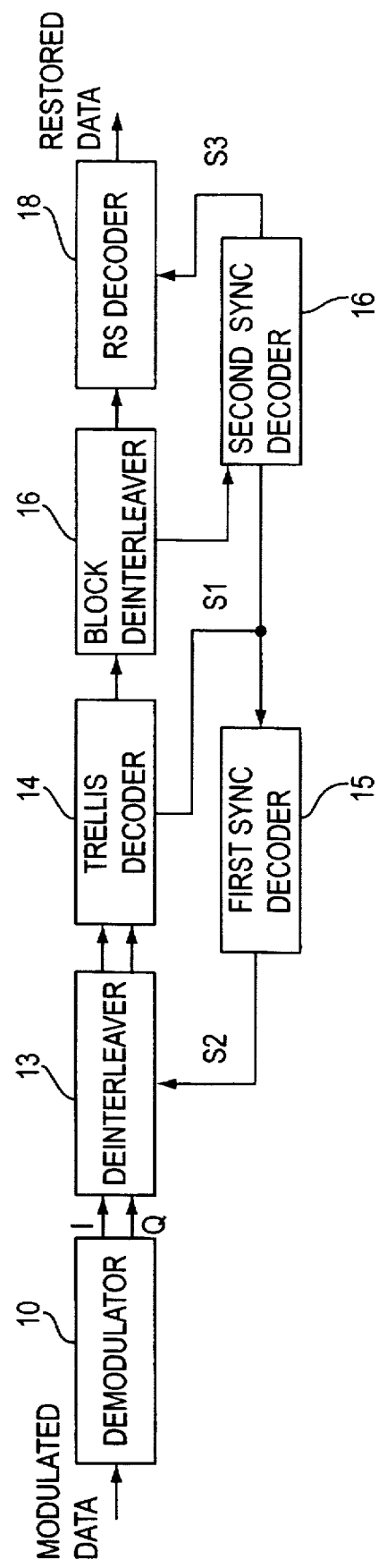
FIG. 2 is a block diagram showing a restoration apparatus of a conventional multi level/phase modulation data.
Figure 3A:
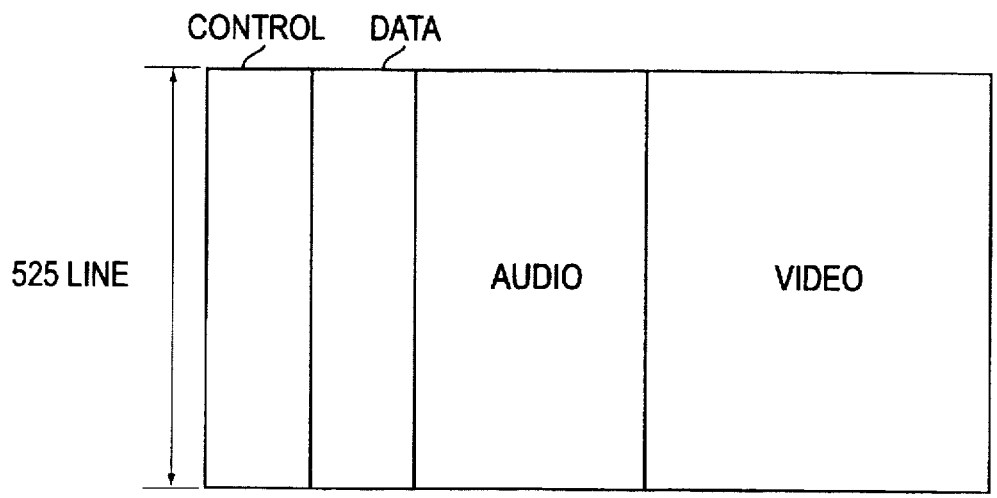
FIG. 3A is a data format for block deinterleaving according to an embodiment of the present invention.
Figure 3B:
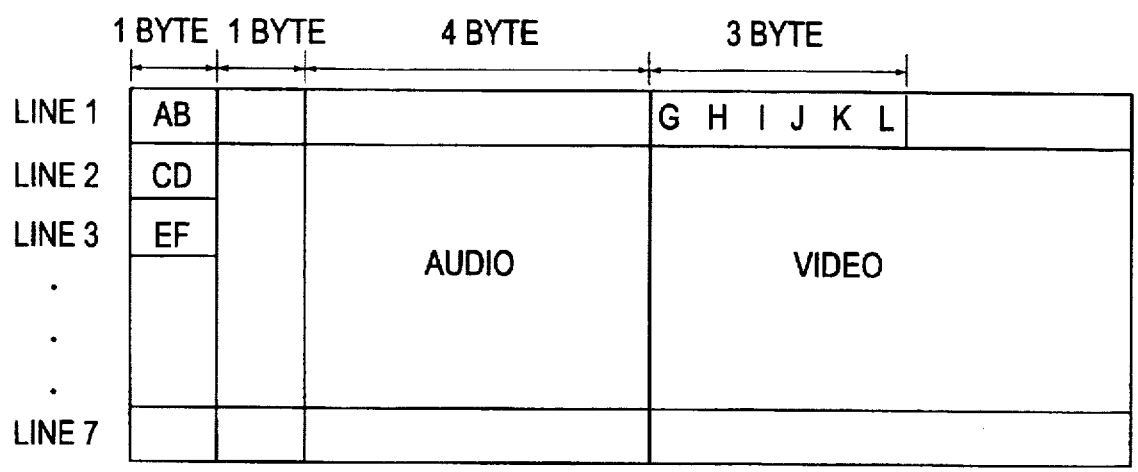
FIG. 3B is a view expanding the description of part of a data block in FIG. 3A.
Figure 3C:
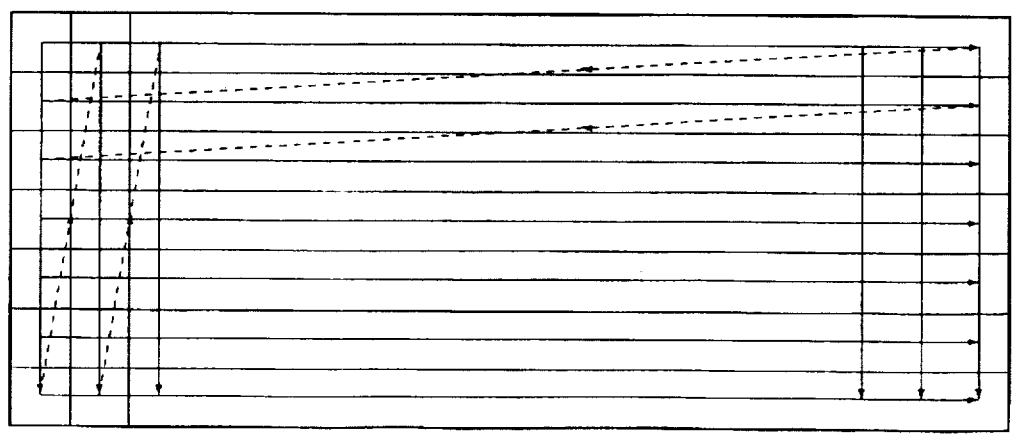
FIG. 3C is a conceptual view for illustrating block interleaving with respect to the data block shown in FIG. 3B.
Figure 4:
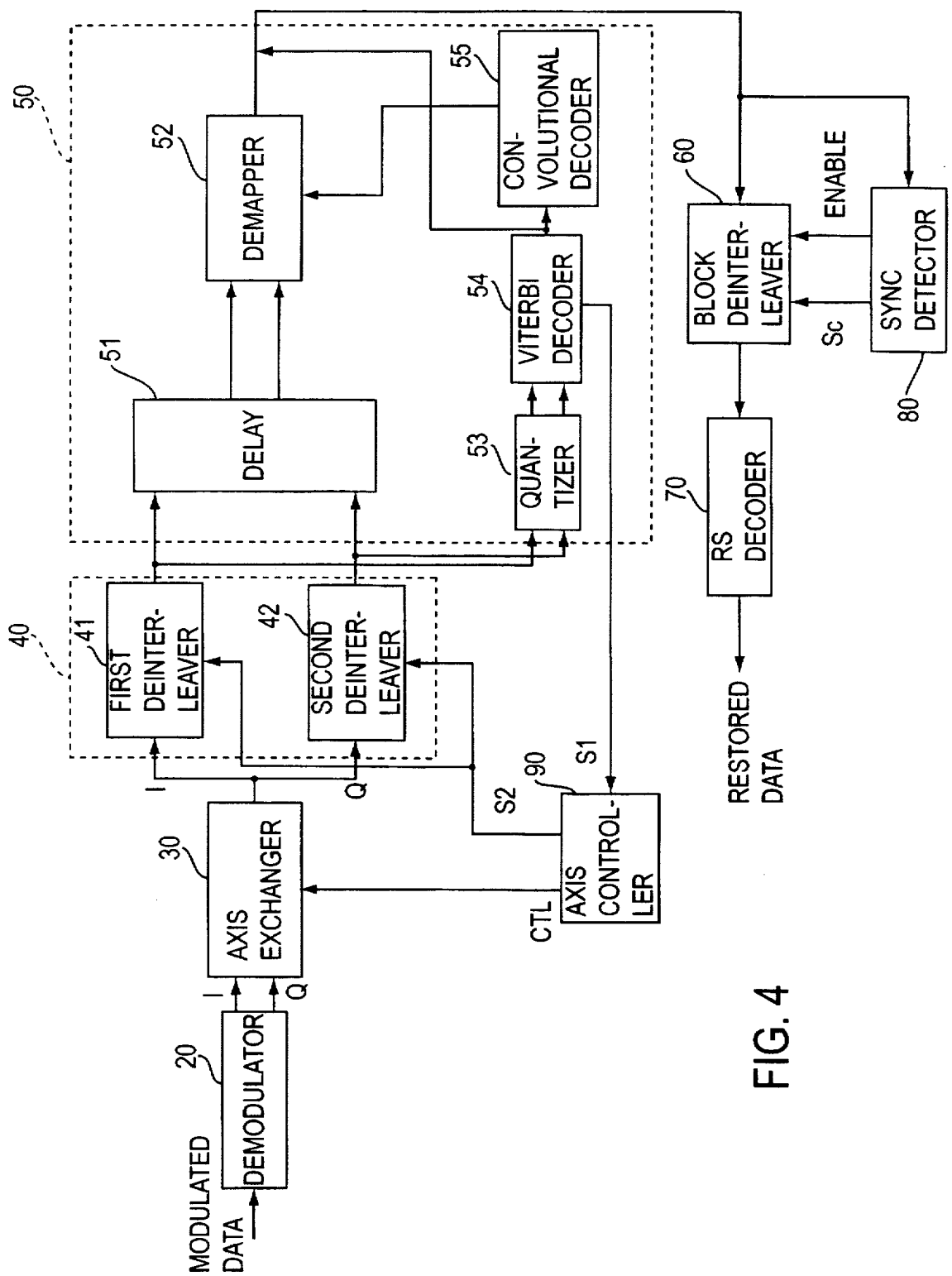
FIG. 4 is a block diagram of a data receiver according to an embodiment of the present invention.

FIG. 4 illustrates an apparatus according to an embodiment of the present invention which detects a sync state for a Viterbi decoder using the same method as U.S. Pat. No. 5,398,260. The prior art discloses that block deinterleaving is performed on the basis of data which is synchronized in the Viterbi decoder, and an operation of a RS decoder is controlled according to an out-of-sync signal. The apparatus of the present invention independently executes the detection of a sync state for block deinterleaving. Prior to describing the FIG. 4 apparatus, the data format for block interleaving at the transmission end will be described with reference to the drawing of FIGS. 3A to 3C.

FIG. 3A shows a data format which is composed of 525 lines, each of which is composed of 156 bytes. A data block includes control data CONTROL, audio data AUDIO, video data VIDEO, and a separately added DATA. A specific data format for even lines within a data block is shown in FIG. 3B. English letters "A", "B", "C", "D", "E", "F", "G", "H", "I", "J", "K" and "L" are sync codes for a sync signal, and each sync code is inserted every period suitable for deinterleaving the data. Of the sync codes, "A", "B", "C", "D", "E" and "F" are located in a control data area, and "G", "H", "I", "J", "K" and "L" are placed in a video data area. The positions into which sync codes are inserted, the number of bits, and a bit value are determined by a designer and are obtained by routine experimentation. Preferably, sync codes are set to have little correlation with other data to be transmitted. Block interleaving of a data format, described with reference to FIGS. 3A and 3B, is composed of a unit of seven lines as shown in FIG. 3C. Block interleaving is achieved by performing an operation such that data applied in an arrow order of a horizontal direction is output in that of a vertical direction.

The FIG. 4 apparatus according to an embodiment of the present invention, receives the data which is RS coded, block-interleaved, Trellis coded, PRN interleaved, modulated and transmitted thereto. The modulated data is demodulated in a demodulator 20, and I-axis data and Q-axis data obtained by demodulation is supplied to an axis exchanger 30.

Axis exchanger 30 includes two switches (not shown) which are switched according to a predetermined control signal CTL. The two switches perform switching operations for exchanging phase axes of the I-axis and Q-axis data according to the control signal CTL. From axis exchanger 30, the I-axis data is applied to a first deinterleaver 41 and the Q-axis signal is applied to a second deinterleaver 42. Here, first deinterleaver 41 and second deinterleaver 42 deinterleave the data of the axis which is selected by axis exchanger 30, respectively. The I-axis signal which is applied to first deinterleaver 41 is not applied to second deinterleaver 42, and the Q-axis signal which is applied to first deinterleaver 41 is not applied to second deinterleaver 42. First and second deinterleavers 41 and 42 each deinterleave the data applied from axis exchanger 30, based on pseudo random numbers. The data respectively deinterleaved in first and second deinterleavers 41 and 42 is supplied to a Trellis decoder 50.

Trellis decoder 50 includes a delay 51, a demapper 52, a quantizer 53, a Viterbi decoder 54 and convolutional encoder 55. Quantizer 53 transforms the input I-axis and Q-axis data into a Viterbi coded quadrature phase shift keying format, and outputs the transformed data. That is, the data of a TCM format, which is output from first and second deinterleavers 41 and 42, is quantized as data having a phase of decodable format in Viterbi decoder 54. Viterbi decoder 54 decodes the quantized symbols which are supplied from quantizer 53 according to the Viterbi algorithm. At the same time, a predetermined out-of-sync signal S1, based on the cumulative distance of the symbols is outputted. Particularly, when the cumulative distance of the symbols is larger than a predetermined reference value, Viterbi decoder 54 outputs a predetermined out-of-sync signal S1. The out-of-sync signal S1 outputted from Viterbi decoder 54 is supplied to an axis controller 90. Then, axis controller 90 generates a predetermined sync adjustment control signal S2 and supplies the sync adjustment control signal S2 to first and second deinterleavers 41 and 42. When first and second deinterleavers 41 and 42 receive sync adjustment signal S2, a deinterleaving sync position is shifted by a predetermined interval, to deinterleave the input data according to the shifted sync position. Sync adjustment control signal S2 is generated based on the detected out-of-sync signal S1. In the case that a phase error is ±90°, axis controller 90 generates the control signal CTL to shift phase axes with each other.

The control signal CTL is generated on the basis of the out-of-sync signal S1 supplied from Viterbi decoder 54. U.S. Pat. No. 5,398,260 discloses the generation of the control signal CTL and signal processing relating to the exchange of phase axes based on the generated control signal. If a series of processes which shift the deinterleaving sync position is repetitively performed, Viterbi decoder 54 receives the deinterleaved data according to the matched sync from deinterleavers 41 and 42 and Viterbi-decodes the received data. A differential decoder (not shown) differentially decodes the output data from Viterbi-decoder 54 and outputs the differentially decoded data. For example, when the differentially decoded data is composed of a codeword having uncoded bits and coded bits, Viterbi decoder 54 outputs the data which is obtained by decoding the encoded bits, together with the uncoded bits which are not decoded. The output data from Viterbi decoder 54 is again supplied to convolutional encoder 55. Convolutional encoder 55 having a differential encoder (not shown) again differentially encodes the differentially decoded data output from Viterbi decoder 54, and convolution-encodes the differentially coded data. As a result, the differentially coded data obtained by the differential encoder in convolutional encoder 55 becomes data of the same format as the differentailly encoded data in a transmission end. The reason why the differentially decoded data is respectively differential-encoded or convolution-encoded in convolution encoder 54 is for changing the output data from Viterbi decoder 54 into a data format which can be processed in demapper 52.

At the same time, the I-axis data and the Q-axis data output from first and second deinterleavers 41, 42 are delayed by a delay 51 for a predetermined interval of time, and the delayed data is applied to a demapper 52. Demapper 52 receives the output data from delay 51 and the output of convolutional encoder 55 and determines and outputs data corresponding to uncoded bits of a codeword based on the output data of convolutional encoder 55. The decoded codeword is composed of data to be output correspondingly to the uncoded bits and coded bits output from Viterbi decoder 54. The decoded codeword is supplied to a block deinterleaver 60 and a sync detector 80.

The construction and operation of sync detector 80, which detects a sync for block deinterleaving using the received data from demapper 52, and the Viterbi decoder 54 will be described in detail with reference to FIG. 5 and FIG. 6.

Figure 5:
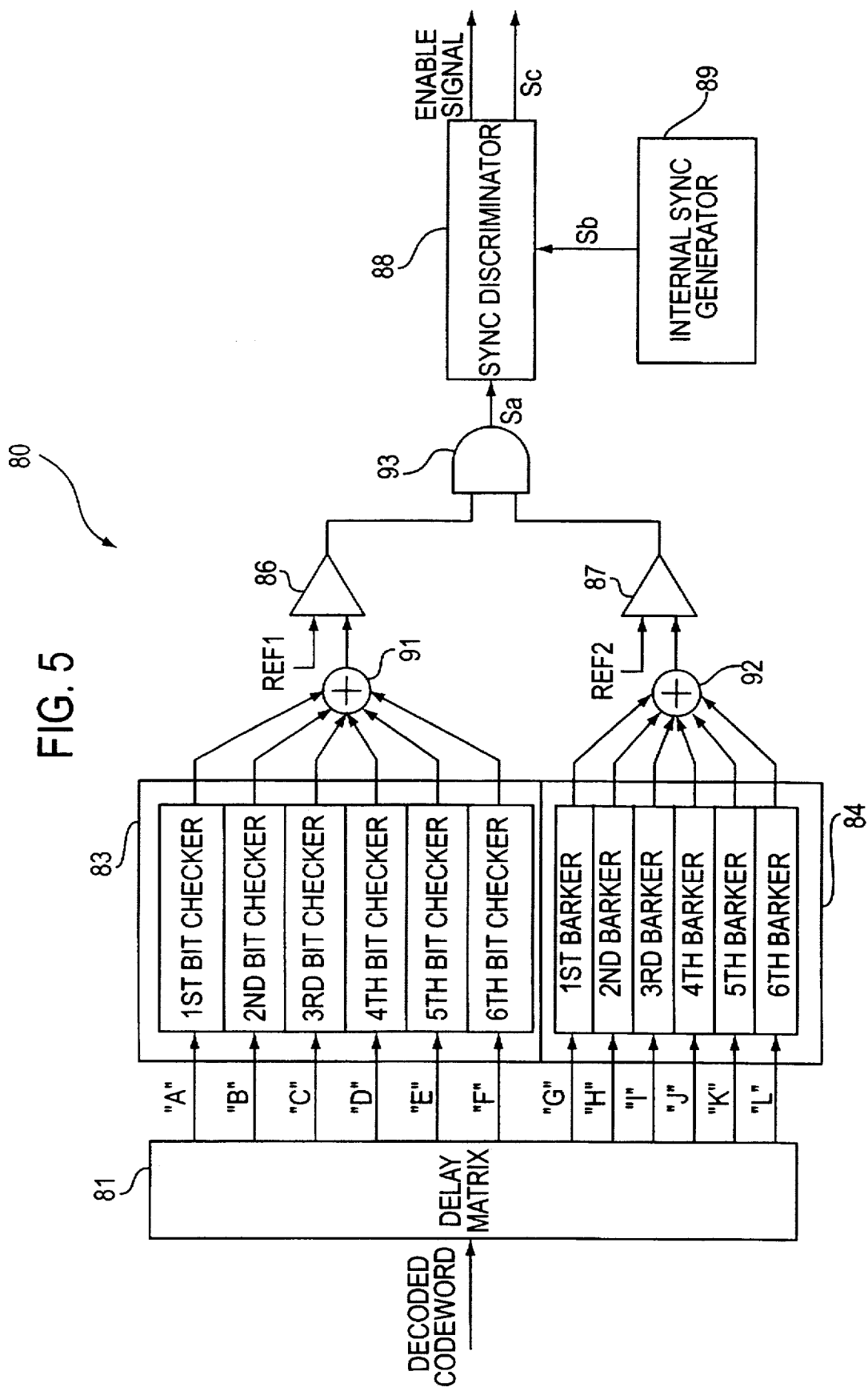
FIG. 5 is a detailed format of a sync detector in FIG. 4.

Sync detector 80, shown in FIG. 5, comprises a delay matrix 81, a bit comparator 83, a code comparator 84, first and second adders 91 and 92, comparators 86 and 87, an AND gate 93, a sync discriminator 88 and an internal sync generator 89.

Delay matrix 81 of FIG. 5 delays the received decoded codewords and outputs the delayed codewords. Delay matrix 81 is designed to output data at positions corresponding to where sync codes are inserted among the block interleaved data. Thus, a sync state is exactly detected by Viterbi decoder 54. When sync codes are not changed by an error, the data which is simultaneously output from delay matrix 81 becomes "A", "B", "C", "D", "E", "F", "G", "H", "I", "J", "K" and "L" as shown in FIG. 5. But, the simultaneously outputted data from delay matrix 81 is actually similar to the above-mentioned sync codes. A part of the simultaneously outputted data from delay matrix 81 is supplied to bit comparator 83 and the other part is applied to code comparator 84. Bit comparator 83 stores one of sync codes "A", "B", "C", "D", "E" and "F", which consists of six bit checkers for comparing the stored sync code with input data. Each bit checker compares a bit value of each place of the stored sync code with that of each place in the input data, and the number of bits having a different value is output. Data output from the six bit checkers is supplied to first adder 91. Code comparator 84 stores one of sync codes "H", "I", "J", "K" and "L", which consists of six bit barkers for comparing values between the stored sync code and input data. Each barker outputs a comparison result value between the stored sync code value and input data value. That is, a comparison value is low when the two values are different from each other, while a comparison value is high when the two values are equal. Data which is obtained by the first adder 91 is compared with a predetermined first reference value REF1 in first comparator 86, and data which is obtained by the second adder 92 is compared with a predetermined second reference value REF2 in second comparator 87. First comparator 86 outputs a signal of high level when the data applied from first adder 91 is less than the first reference value REF1, while second comparator 87 outputs a signal of high level when the data applied from second adder 92 is larger than the second reference value REF2. Here, the reference values REFI and REF2 are to determine similarity between the stored sync codes and the data output simultaneously from delay matrix 81, and are suitably selected by a designer. AND gate 93 outputs a high level signal corresponding thereto if the input signals from comparators 86 and 87 are all high level signals. The high level signal from AND gate 93 is supplied to sync discriminator 88 as a detected sync position signal Sa representing a position that an inserted sync signal is detected from the transmitted data. Sync discriminator 88 determines whether or not an internal sync position signal Sb accords with the detected sync position signal in a period of time, and generates a fixed sync position signal Sc indicating that the two signals are in accord. At the same time sync discriminator 88 generates an enable signal to make block deinterleaver 60 active.

Figure 6:
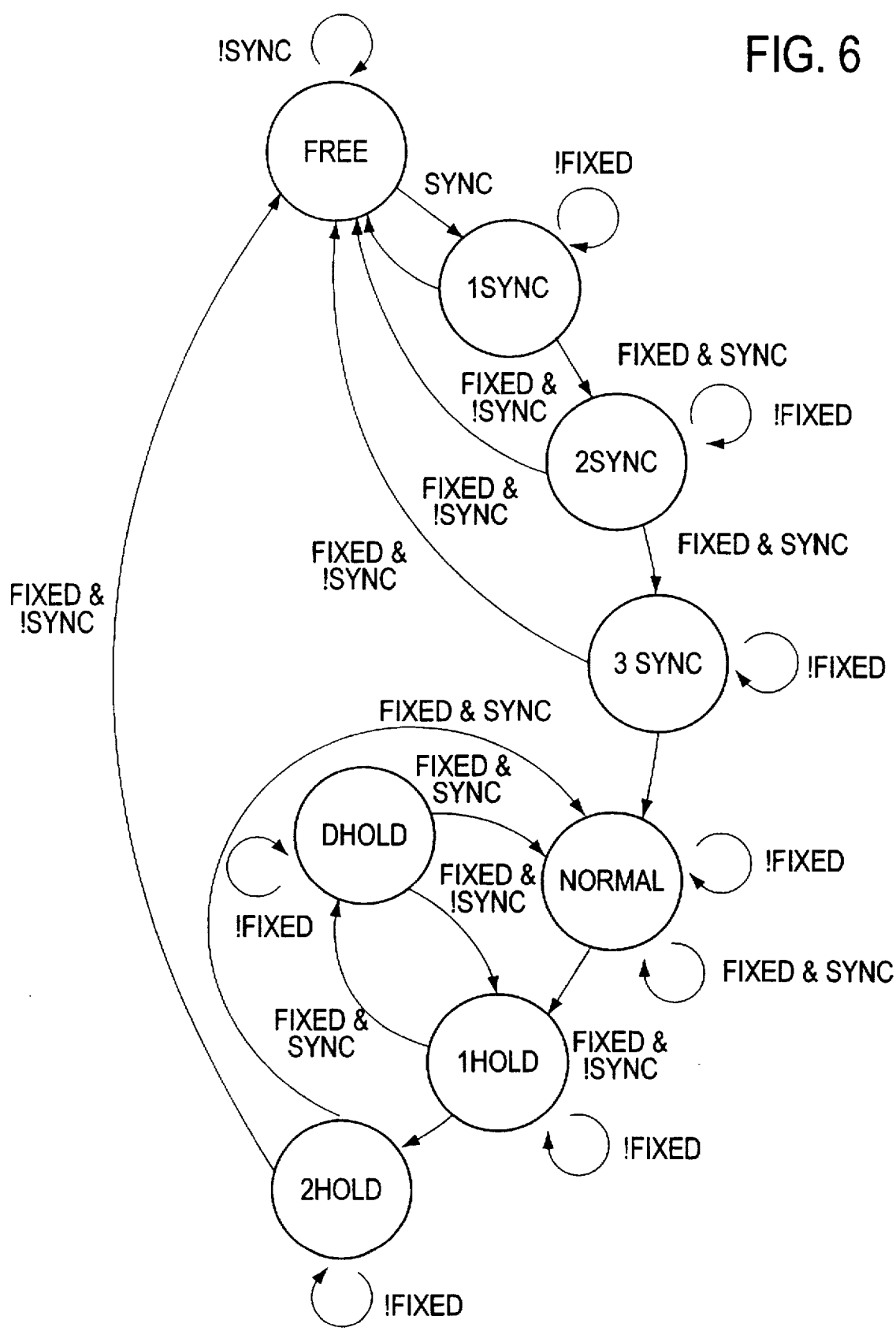
FIG. 6 is a state diagram illustrating an embodiment for a determination process of a sync position signal which is fixed by a sync discriminator in FIG. 5.

An embodiment for a process of determining the fixed sync position signal Sc of sync discriminator 88 based on the comparison result between sync position signals Sa and Sb will be shown in FIG. 6. In the state diagram of FIG. 6, "sync" is a sync position signal Sa detected in AND gate 93, and "fixed" represents that an internal sync position signal Sb generated by internal sync generator 89 is in accord with the detected sync position signal Sa. "Free" means that the detected sync position signal Sa is not in. Since sync discriminator 88 does not generate an enable signal under a free state, no operation of block deinterleaver 60 is made. When the detected sync position signal Sa accords with the internal sync position signal Sb in a free state of an initial state, the free state is moved and a normal state via 1sync to 3sync. Otherwise, when the detected sync position signal Sa does not accord with the internal sync position signal Sb, the normal state is moved to a free state. In the case that the detected sync position signal Sa does not exist despite a normal state, that is, in the case of "fixed & 1sync", the normal state is moved to a "1hold" state. When the detected sync position signal Sa is not in a "2hold" state, the "2hold" state is moved to the "free" state.

Block deinterleaver 60 block-deinterleaves the decoded codewords which is composed of data output from demapper 52 and Viterbi decoder 54 and outputs the block-deinterleaved data. Block deinterleaving is composed as a unit of seven lines which is described with reference to FIGS. 3A to 3C. The block-deinterleaved data and fixed sync position signal Sc are supplied to RS decoder 70, which RS decodes the block-deinterleaved data according to the fixed sync position signal Sc, to reinforce an error correction function of transmission data.

As described above, the present invention has the effect of being capable of performing block deinterleaving, even though no error correction is made, so that a sync signal for block deinterleaving by Trellis decoder is identical to a sync signal at the transmission end.

Even though the multi level/phase modulation and sync detection for block deinterleaving with respect to the error-corrected data is described in the apparatus of the above-mentioned embodiment, the present invention can be applied to modulated data by another modulation technique and is not limited to this embodiment.

What is claimed is:

1. An apparatus for receiving block-interleaved and modulated data and restoring the block-interleaved and modulated data into original data, the apparatus comprising:

demodulation and error correction means for demodulating and error-correcting received data and outputting the modulated and error-corrected data;

synchronization means for generating a fixed sync position signal based on the comparison between the data output from said demodulation and error correction means and stored block sync data; and block deinterleaver means for block-deinterleaving the data which is output from said demodulation and error correction means according to the fixed sync position signal.

2. An apparatus for receiving block-interleaved and modulated data and restoring the block-interleaved and modulated data into original data, the apparatus comprising:

demodulation and error correction means for demodulating and error-correcting received data and outputting demodulated and error-corrected data;

synchronization means for generating a fixed sync position signal based on the comparison between the data output from said demodulation and error correction means and stored block sync data; and block deinterleaver means for block-deinterleaving the data which is output from said demodulation and error correction means according to the fixed sync position signal, wherein said demodulation and error correction means comprises a demodulator for demodulating the received modulated data to produce I-axis data and Q-axis data;

an axis exchanger, receiving the I-axis data and the Q-axis data obtained from said demodulator and a control signal, for selectively exchanging the axes of the I-axis data and the Q-axis data according to the control signal;

deinterleaver means for deinterleaving the I-axis data and the Q-axis data which is output from said axis exchanger, respectively;

a Viterbi-decoding portion for decoding the deinterleaved data according to a Viterbi algorithm and outputting a predetermined out-of-sync signal when it is determined that the Viterbi-decoded data is not synchronized; and a sync detecting portion for detecting the out-of-sync signal outputted from said Viterbi-decoding portion to supply a sync adjustment control signal for shifting a data deinterleaving sync position to the deinterleaver and to supply the control signal to said axis exchanger.

3. An apparatus for receiving block-interleaved and modulated data and restoring the block-interleaved and modulated data into original data, the apparatus comprising:

demodulation and error correction means for demodulating and error-correcting received data and outputting demodulated and error-corrected data;

synchronization means for generating a fixed sync position signal based on the comparison between the data output from said demodulation and error correction means and stored block sync data; and block deinterleaver means for block-deinterleaving the data which is output from said demodulation and error correction means according to the fixed sync position signal, wherein said synchronization means comprised delay means for delaying data from said demodulation and error correction means, and outputting a plurality of delayed data at positions corresponding to where sync codes, being components of said block data, are inserted;

detection means for detecting sync position signal, based on the comparison result between a plurality of delayed data from said delay means and stored sync codes;

means for generating an internal sync position signal; and sync discriminator means for generating the fixed sync position signal when the sync position signal detected by said detection means accords with the internal sync position signal.

4. The apparatus according to claim 3, wherein said detection means detects a sync position signal based on the similarity between a plurality of delayed data from said delay means and the stored sync codes.

5. The apparatus according to claim 3, wherein said detection means comprises bit comparison means for comparing, bit by bit, a first part of the plurality of delayed data output from said delay means with of a first set of sync codes of said block sync data, and outputting the number of bits in which bit values are different in said delayed data and said first set as a result of comparison;

code comparison means for comparing a second part of the plurality of delayed data output from said delay means with numbers of a second set of sync codes of said block sync data, and outputting a resultant value;

a first comparator for comparing the number from said bit comparison means with a predetermined first reference value, and outputting a first binary signal according to the result of comparison;

a second comparator for comparing the resultant value from said code comparison means with a predetermined second reference value, and outputting a second binary signal according to the result of comparison; and an AND gate for logically summing the first and second binary signals output from said first and second comparators, respectively, and for outputting sync position signal when a sum of the binary signals is high.

6. The apparatus according to claim 5, wherein said code comparison means produces comparison values, wherein a comparison value is low when values between said second set of sync codes and data are different from each other, while a comparison value is high when said second set of sync codes and data are equal, wherein said resultant value corresponds to a sum of said comparison values.

7. The apparatus according to claim 6, wherein said first comparator outputs a high level signal when the number is less than the first reference value; and said second comparator outputs a high level signal when the value which is output from said code comparison means is larger than the second reference value.

8. The apparatus according to claim 3, wherein said sync discriminator means generates the fixed sync position signal when the detected sync position signal and the internal sync position signal are applied thereto at the same time.

9. The apparatus according to claim 3, wherein said sync discriminator means controls said block deinterleaver means not to be operated when the fixed sync position signal is not generated.

10. An apparatus for receiving block-interleaved and modulated data and for restoring the block-interleaved and modulated data into original data, the apparatus comprising:

demodulation and error correction means for demodulating and error-correcting received data and outputting demodulated and error-corrected data;

block deinterleaver means for block-deinterleaving the demodulated and error-corrected data which is output from said demodulation and error correction means; and a synchronization detector which receives the data output from said demodulation and error correction means and provides a sync detection signal to said block deinterleaver means, said synchronization detector comprising:

a plurality of comparators which compare said data from said demodulation and error correction means with at least one stored sync block, wherein said sync detection signal is output to said block deinterleaver means when a result of said comparator indicates that said stored sync block and said data from said demodulation and error correction means coincide to a predetermined degree.

* * * * *